US010189262B2

(12) United States Patent
Nakamura et al.

(10) Patent No.: US 10,189,262 B2
(45) Date of Patent: Jan. 29, 2019

(54) CLEANING LIQUID, CONTAINER, INKJET PRINTING METHOD, INKJET PRINTING DEVICE, AND SET OF INK AND CLEANING LIQUID

(71) Applicants: Yuta Nakamura, Kanagawa (JP); Michihiko Namba, Kanagawa (JP); Masahiro Kido, Kanagawa (JP); Hiroaki Takahashi, Kanagawa (JP); Hikaru Kobayashi, Kanagawa (JP); Naoto Shimura, Tokyo (JP); Akiko Bannai, Kanagawa (JP); Shizuka Kohzuki, Kanagawa (JP)

(72) Inventors: Yuta Nakamura, Kanagawa (JP); Michihiko Namba, Kanagawa (JP); Masahiro Kido, Kanagawa (JP); Hiroaki Takahashi, Kanagawa (JP); Hikaru Kobayashi, Kanagawa (JP); Naoto Shimura, Tokyo (JP); Akiko Bannai, Kanagawa (JP); Shizuka Kohzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/842,003

(22) Filed: Dec. 14, 2017

(65) Prior Publication Data

US 2018/0170061 A1    Jun. 21, 2018

(30) Foreign Application Priority Data

Dec. 15, 2016  (JP) .................................. 2016-243425
Oct. 31, 2017  (JP) .................................. 2017-210601

(51) Int. Cl.
| | | |
|---|---|---|
| *B41J 2/165* | (2006.01) | |
| *C09D 11/30* | (2014.01) | |
| *C09D 11/40* | (2014.01) | |
| *C09D 11/102* | (2014.01) | |
| *C09D 11/38* | (2014.01) | |
| *C09D 11/54* | (2014.01) | |
| *C09D 11/322* | (2014.01) | |
| *C11D 7/50* | (2006.01) | |

(52) U.S. Cl.
CPC ......... *B41J 2/16552* (2013.01); *C09D 11/102* (2013.01); *C09D 11/322* (2013.01);
(Continued)

(58) Field of Classification Search
CPC ...... B41J 2/16552; C11D 3/43; C11D 7/5022; C09D 11/30; C09D 11/40; C09D 9/00;
(Continued)

(56) References Cited

U.S. PATENT DOCUMENTS

2010/0097587 A1* 4/2010 Petrus De Jong .. G03F 7/70341
355/30
2013/0194345 A1   8/2013 Tamai et al.
(Continued)

FOREIGN PATENT DOCUMENTS

EP    2 682 269 A1    1/2014
JP    2005-008735     1/2005
(Continued)

OTHER PUBLICATIONS

Extended European Search Report dated Feb. 27, 2018 in Patent Application No. 17207473.4, citing documents AA, AB, AC and AO therein, 5 pages.

*Primary Examiner* — Huan Tran
(74) *Attorney, Agent, or Firm* — Oblon, McClelland, Maier & Neustadt, L.L.P.

(57) ABSTRACT

A cleaning liquid for rinsing an ink adhering to an article includes water and a first organic solvent, wherein a liquid mixture of the water and the first organic solvent has a Hansen solubility parameter including a hydrogen bond term of 10.0 $(cal/cm^3)^{1/2}$ or less, wherein the ink includes water, a second organic solvent, a polyurethane resin particle, and a polysiloxane surfactant having an HLB value of 8 or less, wherein the polyurethane resin particle accounts for 5 percent by mass or more of a total amount of the ink.

9 Claims, 3 Drawing Sheets

(52) U.S. Cl.
CPC ............. *C09D 11/38* (2013.01); *C09D 11/40* (2013.01); *C09D 11/54* (2013.01); *C11D 7/5022* (2013.01)

(58) Field of Classification Search
CPC ...... C09D 9/005; C09D 11/322; C09D 11/54; C09D 11/38; C09D 11/102
See application file for complete search history.

(56) References Cited

U.S. PATENT DOCUMENTS

| | | |
|---|---|---|
| 2013/0213440 A1 | 8/2013 | Ohta |
| 2014/0085376 A1 | 3/2014 | Kato et al. |
| 2017/0183528 A1* | 6/2017 | Kohzuki ................ C09D 11/54 |
| 2017/0267879 A1 | 9/2017 | Kohzuki et al. |
| 2017/0298243 A1 | 10/2017 | Ohta |

FOREIGN PATENT DOCUMENTS

| | | |
|---|---|---|
| JP | 2005-220352 | 8/2005 |
| JP | 2011-094082 | 5/2011 |
| JP | 2011-140556 | 7/2011 |
| JP | 2012-158171 | 8/2012 |
| JP | 2013-518138 | 5/2013 |
| JP | 2013-136703 | 7/2013 |
| JP | 2013-158918 | 8/2013 |
| JP | 2014-162819 | 9/2014 |
| WO | WO2011/089238 A1 | 7/2011 |

* cited by examiner

CLEANING LIQUID, CONTAINER, INKJET PRINTING METHOD, INKJET PRINTING DEVICE, AND SET OF INK AND CLEANING LIQUID

CROSS-REFERENCE TO RELATED APPLICATIONS

This patent application is based on and claims priority pursuant to 35 U.S.C. § 119 to Japanese Patent Application Nos. 2016-243425 and 2017-210601, filed on Dec. 15, 2016, and Oct. 31, 2017, respectively, in the Japan Patent Office, the entire disclosures of which are hereby incorporated by reference herein.

BACKGROUND

Technical Field

The present invention relates to a cleaning liquid, a container, an inkjet printing method, an inkjet printing device, and a set of an ink and the cleaning liquid.

Description of the Related Art

For industrial use in advertisement and signboards, for example, non-permeable recording media such as plastic film are used in order to improve durability for light, water, abrasion, etc. Naturally, inks for such non-permeable recording media have been developed.

As such inks, for example, solvent-based inks using organic solvents as solvents, and ultraviolet-curable inks are mainly constituted of polymerizable monomers have been widely used. However, the solvent-based ink causes a concern about an adverse impact on the environment due to evaporation of the organic solvent. The ultraviolet curing ink has a limited choice of polymerizable monomers in terms of safety in some cases.

For this reason, an aqueous ink capable of being directly recorded on non-permeable recording media have been proposed without heavy burden on the environment.

This ink contains a resin to secure fixability on a non-permeable recording medium. However, if an ink contains a resin, the ink adheres to a recording head, aggregates, and dries during continuous recording, which may degrade discharging stability of the ink. This requires rinsing the ink attached to a recording head, etc. to secure discharging stability of the ink.

However, since the ink containing a resin firmly adheres to a recording head, typical cleaning liquids are not sufficient to remove the ink.

In an attempt to solve this issue, a cleaning liquid containing polyoxyalkylene monoalkylether, glycerin, and water have been proposed.

In addition, an ink set for a recording ink containing a resin and a replacement ink containing an active agent and a solvent have been proposed.

Moreover, a cleaning composition regulating the Hansen solubility parameter of the solvent therein has been proposed.

SUMMARY

According to the present invention, provided is an improved cleaning liquid for rinsing an ink adhering to an article, which includes water and a first organic solvent, wherein a liquid mixture of the water and the first organic solvent has a Hansen solubility parameter including a hydrogen bond term of 10.0 $(cal/cm^3)^{1/2}$ or less, wherein the ink includes water, a second organic solvent, a polyurethane resin particle, and a polysiloxane surfactant having an HLB value of 8 or less, wherein the polyurethane resin particle accounts for 5 percent by mass or more of a total amount of the ink.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
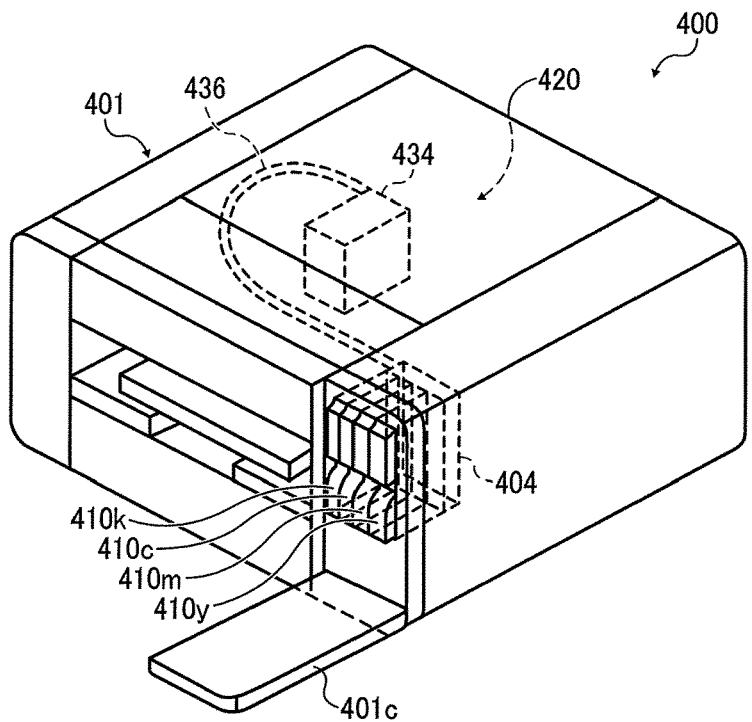
FIG. 1 is a diagram illustrating a perspective view illustrating an example of a serial type image forming apparatus.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

Embodiments of the present disclosure are described in detail below.

Cleaning Liquid

The cleaning liquid according to an embodiment of the present disclosure is used to rinse a particular ink adhering to an article. The cleaning liquid contains water and a first organic solvent. A liquid mixture of the water and the first organic solvent has a hydrogen bond term of the Hansen solubility parameter of 10.0 $(cal/cm^3)^{1/2}$ or less.

The polysiloxane surfactant having an HLB value of 8 or less in the particular ink described later is easily compatible with a liquid mixture having a hydrogen bond term of the Hansen solubility parameter of 10.0 $(cal/cm^3)^{1/2}$ or less and thought to assist in dispersing the components, mainly polysiloxane resin particle, contained in the ink in the liquid mixture, thereby improving the cleaning power. Since the polysiloxane surfactant in the ink has good affinity with an article to which the ink adheres, for example, a repellent film of the head nozzle surface, the ink further adheres to the nozzle surface. However, as described above, the liquid mixture of the cleaning liquid of the present disclosure has a good compatibility with the polysiloxane surfactant having an HLB value of 8 or less, which disperses the polyurethane resin particle in the liquid mixture to drastically enhance the cleaning power against the article. As a result, once the article is cleaned, discharging stability of the ink is restored.

Liquid Mixture

The liquid mixture contains water and a solvent (first organic solvent) and the hydrogen bond term of the Hansen solubility parameter is 10 $(cal/cm^3)^{1/2}$ or less.

Hydrogen Bond Term of Hansen Solubility Parameter

The hydrogen bond terms (hereinafter also referred to as δH) of the Hansen solubility parameter (hereinafter also referred to as HSP) is from 10.0 $(cal/cm^3)^{1/2}$ or less and preferably 8.5 $(cal/cm^3)^{1/2}$ or less. When the hydrogen bond term of the Hansen solubility parameter is 10 $(cal/cm^3)^{1/2}$ or less, cleaning power is improved. Moreover, a combinational use with an ink containing a polysiloxane surfactant having an HLB value of 8 or less boosts the discharging reliability.

When the hydrogen bond term of the Hansen solubility parameter is 8.5 $(cal/cm^3)^{1/2}$ or less, discharging stability is furthermore improved.

Also, according to the present disclosure, the liquid mixture preferably contains at least one organic solvent having a hydrogen bond term of the Hansen solubility parameter of 5.0 $(cal/cm^3)^{1/2}$ or less. In this embodiment, cleaning power is furthermore improved. The proportion of the organic solvent having a hydrogen bond term of the Hansen solubility parameter of 5.0 $(cal/cm^3)^{1/2}$ or less is preferably from 10 to 70 percent by mass and more preferably from 15 to 60 percent by mass in the liquid mixture.

The Hansen solubility parameter (HSP) is what is represented in a three dimensional space using three components of dispersion term (δD), polarity term (δP), and hydrogen bond term (δH), which are obtained by dividing the solubility parameter (SP) introduced by Hidebrand. The dispersion term (δD) is based on proximity force of Van Der Waals. The polarity (δP) is also referred to as polarization term and based on dipole moment and dielectric constant. The hydrogen bond term (δH) includes an intermolecular force based on hydrogen bond and furthermore other unclassifiable factors such as π-π interaction. In the present disclosure, the hydrogen bond term (δH) is used.

The three components of the dispersion term (δD), the polarity term (δP), and the hydrogen bond term (δH) have been obtained by Hansen and his successors. The details are described in Polymer Handbook (fourth edition), VII-698 to 711. The definition and calculation of HSP are described in the following document.

Hansen Solubility Parameters: A Users Hand book (authored by Charles M. Hansen, published by CRC Press in 2007).

Hansen solubility parameters of many solvents and resins have been obtained, which are described in, for example, Industrial Solvents Handbook, authored by Wesley L. Archer.

The hydrogen bond term (δH) of the Hansen solubility parameter of the liquid mixture mentioned above can be obtained from the following relation.

Hydrogen bond term (δ*H*) of Hansen Solubility
Parameter of liquid mixture=[{(δ*H* of water)×
(volume percent of water in liquid mixture)}/
100]+[{(δ*H* of organic solvent)×(volume percent of organic solvent in liquid mixture)}/100]

As the first organic solvent (first organic solvent) in the liquid mixture, it is suitable to select an organic solvent of the liquid mixture having a hydrogen bond term of a Hansen solubility parameter of 10 $(cal/cm^3)^{1/2}$ or less. Specific examples include, but are not limited to, 1,2-butanediol {δH of HSP: 10.39 $(cal/cm^3)^{1/2}$}, 3-methoxy-3-methyl-1-butanol {δH of HSP: 6.29 $(cal/cm^3)^{1/2}$}, 2-pyrroridone {δH of HSP: 4.39 $(cal/cm^3)^{1/2}$}, 1,2-hexane diol {δH of HSP: 17.1 $(cal/cm^3)^{1/2}$}, and 1,2-propane diol {δH of HSP: 21.3 $(cal/cm^3)^{1/2}$}. The organic solvent in the liquid mixture can be used alone or in combination.

Water in the liquid mixture is not particularly limited and can be suitably selected to suit to a particular application.

Specific examples include pure water such as deionized water, ultrafiltered water, reverse osmosis water, and distilled water and ultra pure water. These can be used alone or in combination.

The cleaning liquid of the present disclosure may include additives such as surfactants and defoaming agents.

The proportion of the organic solvent in the liquid mixture is preferably from 30 to 90 percent by mass, more preferably from 50 to 85 percent by mass, and particularly preferably from 60 to 80 percent by mass.

The proportion of the liquid mixture in the cleaning liquid of the present disclosure is preferably 90 percent by mass or more and more preferably 95 percent by mass or more.

Container

The container of the present disclosure contains the cleaning liquid of the present disclosure and an accommodating unit accommodating the cleaning liquid.

The container accommodates the cleaning liquid in the container and includes other optional suitably-selected members.

There is no specific limit to the container. It is possible to select any form, any structure, any size, and any material. For example, a container having at least a bag formed of aluminum laminate film, a resin film, etc. can be suitably used.

Ink

The ink for use in the present disclosure (hereinafter also referred to as the ink of the present disclosure) includes water, a second organic solvent, a polyurethane resin particle, and a polysiloxane surfactant having an HLB value of 8 or less. The polyurethane resin particle accounts for 5 percent by mass of the total amount of the ink. The ink may furthermore optionally contain other components.

In general, while the solvent ink is fixed swelling a non-permeating recording medium by the organic solvent in the ink so that fixability on the non-permeating recording medium is excellent, a typical aqueous ink forms an ink film on a recording medium as the final product so that fixability of the film on the recording medium is insufficient, which speeds down the processing. In addition, assuming the outdoor use of recorded matter, by far tough scratch resistance and image hardness are required in comparison with indoor use. However, the typical aqueous ink is not on a par with the solvent ink regarding such properties.

Of the components contained in the ink, taking it into account that a surfactant has a large impact on fixability of the ink on a non-permeation recording medium, selection of the surfactant is significant. The present inventors have found that, if polysiloxane surfactant having an HLB value of 8 or less is added to an ink, fixability of the ink significantly ameliorates. This mechanism is not clear but can be inferred that the polysiloxane surfactant having an HLB value of 8 or less increases hydrophobicity, which improves affinity with various non-permeating recording media.

In addition, the present inventors have also found that since fixability of the ink on non-permeating recording media increases, occurrence of beading, which is a phenomenon of unification of adjacent ink droplets after landing on the recording medium, can be also reduced at the time of high performance recording so that quality images can be obtained. In addition, considering that if the fixing speed increases, the ink dries faster and attachability ameliorates, the present inventors have also found it possible to reduce transfer of images and texts on the opposite surface of a recording medium that occurs at the time of rolling up the recording medium after recording.

The component of the ink will be described below in detail.

Polysiloxane Surfactant

As the polysiloxane-based surfactants, for example, the following is preferable: a compound (silicone-based compound) including a hydrophilic group or a hydrophilic polymer chain in the side chain of a compound having a polysiloxane backbone such as polydimethylsiloxane and a compound including a hydrophilic group or a hydrophilic polymer chain at a distal end of a compound (silicone-based compound) having a polysiloxane backbone such as polydimethylsiloxane. The polysiloxane surfactant means a compound having a polysiloxane backbone in its structure and includes a polysiloxane-based surfactant.

Examples of the hydrophilic group and the hydrophilic polymer chain are polyether groups (polyethyleneoxide, polypropylene oxide, and copolymers thereof), polyglycerin ($C_3H_6(CH_2CH(OH)CH_2O)_n$—H, etc.), pyrolidone, betaine ($C_3H_6N^+(C_2H_4)_2$—$CH_2COO^-$, etc.), sulfates ($C_3H_6O$ ($C_2H_4O)_n$—$SO_3Na$, etc.), phosphates ($C_3H_6O(C_2H_4O)_n$—P (=O)OHONa, etc.), and quarternary salts ($C_3H_6N_+(C_2H_4)_3Cl^-$, etc.) In the chemical formulae, n represents an integer of 1 and above. Of these, compounds having a polyether group are preferable.

In addition, a vinyl-based copolymer is also preferable which has a silicone-based compound chain such as polydimethylsiloxane in its side chain. This is obtained by copolymerization of a polydimethylsiloxane having a polymerizable vinyl group at its distal end with a copolymerizable monomer (it is preferable to at least partially use a hydrophilic monomer such as a (meth)acrylic acid or its salt in the monomer).

Of these, compounds having a polysiloxane backbone and a hydrophilic polymer chain are preferable. More preferred are compounds having a polyether group as the hydrophilic polymer chain. In addition, a non-ionic surfactant is particularly preferable in which a polysiloxane surfactant has methylpolysiloxane as a hydrophobic group and a polyoxyethylene backbone as a hydrophilic group.

The HLB value of the polysiloxane surfactant is 8 or less and preferably 4 or less. When the HLB value is 8 or less, excellent ink fixability can be secured on various non-permeating recording media for inkjet recording. Moreover, when 4 or less, image gloss can be improved. Note that it is possible to use two or more kinds of polysiloxane surfactants in an ink. For example, a polysiloxane surfactant having an HLB value of greater than 8 can be used in combination. However, the proportion of such a polysiloxane surfactant is preferably 60 percent by mass or less to the total amount of the polysiloxane surfactants.

HLB value means the balance between the hydrophilic group and the lipophilic group of a surfactant and ranges from 0 to 20. The closer to zero the HLB value is, the more lipophilic an article is. The closer to 20 the HLB value is, the more hydrophilic an article is.

The HLB value is defined by the following relation (Griffin method).

$$HLB\ value = 20 \times (total\ of\ the\ hydrophilic\ sites/molecular\ weight)$$

Examples of the polysiloxane surfactant are polyether-modified silicone and silicone compounds having a polyoxyalkylene group.

The polysiloxane surfactant is available on the market.

Specific example include, but are not limited to, Silface SAG005 (HLB value: 7.0) and Silface SAG008 (HLB value: 7.0), both are manufactured by Nisshin Chemical Co., Ltd., FZ2110 (HLB value: 1.0), FZ2166 (HLB value: 5.8), SH-3772M (HLB value: 6.0), L7001 (HLB value: 7.4), SH-3773M (HLB value: 8.0), all of which are manufactured by Dow Corning Toray Co., Ltd.), KF-945 (HLB value: 4.0), and KF-6017 (HLB value: 4.5), both of which are manufactured by Shin-Etsu Chemical Co., Ltd., and FormBan MS-575 (HLB value: 5.0), manufactured by Ultra Additives Inc.).

The proportion of the polysiloxane surfactant is preferably from 0.1 to 4.0 percent by mass and more preferably from 1.0 to 2.0 percent by mass to the total amount of ink.

When the proportion is from 0.1 to 4.0 percent by mass, fixability of ink onto various non-permeable recording media can be improved and image quality such as gloss can be improved.

Polyurethane Resin Particle

Polyurethane resin particle can impart high gloss and scratch resistance to an image. Moreover, surprisingly, not only the scratch resistance of an applied film formed after recording but also chemical resistance are significantly improved when used with the polysiloxane surfactant and polyurethane resin particle.

As the polyurethane resin particle, for example, polyether-based polyurethane resin particles, polycarbonate-based polyurethane resin particles, and polyester-based polyurethane resin particles are preferable.

There is no specific limit to the polyurethane resin particle and it can be suitably selected to suit to a particular application. For example, polyurethane resin particle, etc. are suitably used, which are obtained by reacting polyol with polyisocyanate.

Polyol

Examples of the polyol are polyether polyols, polycarbonate polyols, and polyester polyols. These can be used alone or in combination.

Polyether Polyol

As the polyether polyol, for example, usable is an article obtained by addition polymerization of an alkyleneoxide to a starting material, which is at least one kind of compounds having two or more active hydrogen atoms.

Specific examples of the compound including two or more active hydrogen atoms include, but are not limited to, ethylene glycol, diethylene glycol, triethylene glycol, propylene glycol, trimethylene glycol, 1,3-butanediol, 1,4-butanediol, 1,6-hexane diol, glycerin, trimethylol ethane, and trimethylol propane.

These can be used alone or in combination.

In addition, specific examples of the alkylene oxide include, but are not limited to, ethylene oxide, propylene oxide, butylene oxide, styrene oxide, epichlorohydrine, and tetrahydrofuran.

These can be used alone or in combination.

The polyether polyol has not a particular limit and can be suitably selected to suit to a particular application. It is preferable to use polyoxytetra methylene glycol or polyoxypropylene glycol in order to obtain a binder for ink having extremely excellent scratch resistance.

These can be used alone or in combination.

Polycarbonate Polyol

As polycarbonate polyol that can be used to manufacture the polyurethane resin particle, for example, a product obtained by reacting a carboxylic acid ester with a polyol or a phosgene with bisphenol A, etc.

These can be used alone or in combination.

Specific examples of carboxylic acid esters include, but are not limited to, methyl carbonate, dimethyl carbonate, ethyl carbonate, diethyl carbonate, cyclocarbonate, and diphenyl carbonate. These can be used alone or in combination.

Specific examples of the polyol include, but are not limited to, dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentane diol, 1,5-hexane diol, 2,5-hexane diol, 1,6-hexane diol, 1,7-heptane diol, 1,8-octane diol, 1,9-nonane diol, 1,10-decane diol, 1,11-undecane diol, 1,12-dodecane diol, 1,4-cyclohexane diol, 1,4-cyclohexane dimethanol, hydroquinone, resorcin, bisphenol A, bisphenol F, and 4,4'-biphenol, and polyether polyols such as polyethylene glycol, polypropylene glycol, and polyoxytetramethylene glycol, and polyester polyols such as polyhexanmethylene adipate, polyhexamethylene succinate, and polycaprolactone.

These can be used alone or in combination.

Polyester Polyol

As the polyester polyol, for example, it is possible to use a product obtained by esterification reaction between a polyol having a low molecular weight and a polycarboxylic acid, a polyester obtained by a ring-opening polymerization reaction of a cyclic ester compound such as ε-caprolactone, or a coploymerized polyester thereof.

These can be used alone or in combination.

Specific examples of the polyol having a low molecular weight include, but are not limited to, ethylene glycol and propylene glycol.

These can be used alone or in combination.

Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof.

These can be used alone or in combination.

Polyisocyanate

Specific examples of the polyisocyanate include, but are not limited to, aromatic diisocyanates such as phenylene diisocyanate, tolylene diisocyanate, diphenylmethane diisocyanate, and naphthalene diisocyanate and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethyl xylylene diisocyanate, and 2,2,4-trimethyl hexamethylene diisocyanate. These can be used alone or in combination.

Of these, using an alicyclic diisocyanate is preferable to form an ink film having an extremely high level of weather resistance for a long period of time taking it into account that the ink in the present disclosure is expected to be applied to posters, signboards, etc., for outdoor use.

Furthermore, it is preferable to add at least one kind of alicyclic diisocyanate, thereby easily acquiring a desired film robustness and abrasion resistance.

Specific examples of the alicyclic diisocyanate include, but are not limited to, isophorone diisocyanate and dicyclohexylmethane diisocyanate.

The content ratio of the alicyclic diisocyanate is preferably 60 percent by mass or greater to the total amount of the isocyanate compound.

Method of Manufacturing Polyurethane Resin Particle

The polyurethane resin particle can be manufactured by typical manufacturing methods. For example, the following method is suitable.

First, a urethane prepolymer having an isocyanate group at its distal end is prepared under the presence of no solvent or an organic solvent through the reaction of the polyol and the polyisocyanate with an equivalent ratio in which isocyanate groups are excessive.

Next, optionally the anionic group in the urethane prepolymer having an isocyanate group at its distal end is neutralized by a neutralizer. Thereafter, subsequent to reaction with a chain elongating agent, the organic solvent in the system is removed if necessary to obtain the urethane resin particle.

Specific examples of the organic solvent for use in manufacturing the polyurethane resin particle include, but are not limited to, ketones such as acetone and methylethyl ketone; ethers such as tetrahydrofuran and dioxane, acetic acid esters such as ethyl acetate and butylacetate, nitriles such as acetonitrile, and amides such as dimethyl formamide, N-methyl pyrolidone, and N-ethyl pyrolidone. These can be used alone or in combination.

Polyamines or other compounds having an active hydrogen group are used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isphorone diamine, 4,4'-dicyclohexyl methane diamine, and 1,4-cyclohexane diamine, polyamines such as diethylene triamine, dipropylene triamine, and triethylene tetramine, hydrazines such as hydradine, N,N'-dimethyl hydrazine, and 1,6-hexamethylene bis hydrazine, and dihydrazides such as succinic acid dihydrazide, adipic acid dihydrazide, glutaric acid dihydrazide, sebacic acid dihydrazide, and isophthalic acid dihydrazide. These can be used alone or in combination.

Specific examples of the compounds having active hydrogen groups include, but are not limited to, glycols such as ethylene glycol, diethylene glycol, triethylene glycol, propylene glycol, 1,3-propane diol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone, and water. These can be used alone or in combination unless degrading the storage stability of ink.

As the polyurethane resin particle, polycarbonate-based polyurethane resin particles are preferable in terms of water resistance, heat resistance, abrasion resistance, weathering resistance, and scratch resistance of images due to high agglomeration power of carbonate groups.

Ink obtained by using polycarbonate-based polyurethane resin particles is suitable for recorded matter for use in severe conditions like outdoor use.

As the polyurethane resin particle, products available on the market can be used.

Specific examples include, but are not limited to, UCOAT UX-485 (polycarbonate-based polyurethane resin particles), UCOAT UWS-145 (polyester-based polyurethane resin particles), PERMARIN UA-368T (polycarbonate-based polyurethane resin particles), and PERMARIN UA-200 (polyether-based polyurethane resin particles) (all manufactured by Sanyo Chemical Industries, Ltd.).

These can be used alone or in combination.

It is preferable to mix a resin emulsion in which the polyurethane resin particle is dispersed in water serving as a dispersion medium with materials such as a coloring material and an organic solvent to obtain an ink.

Taking it account easiness of mixing with an organic solvent, a coloring material, and water to prepare an aqueous ink and uniform dispersion of the polyurethane resin particle in the ink as much as possible, it is preferable that the polyurethane resin particle be added to an ink in a form of a resin emulsion in which the polyurethane resin particle is stably dispersed in water as a dispersion medium.

The polyurethane resin particle is dissolved in an organic solvent to be added to an ink to easily form a film so that a recording layer having a film-like form is formed.

Evaporation of the organic solvent and water accelerates film-forming of the resin particle. Therefore, using the ink in the present disclosure, it is possible to conduct recording obviating the need for heating.

For dispersion of the polyurethane resin particle in water serving as a dispersion medium, it is possible to use resin particles of forced emulsification type utilizing a dispersant or rein particles of so-called self-emulsification type having an aniline group in its molecular structure. Of these, in terms of enhancing strength of recorded matter, resin particles of the so-called self-emulsification type having an aniline group in its molecular structure are preferable.

The acid value of the resin particle of the so-called self-emulsification type is preferably from 5 to 100 mgKOH/g and more preferably from 5 to 50 mgKOH/g in terms of water dispersibility, scratch resistance, and chemical resistance.

Specific examples of the anionic group include, but are not limited to, carboxyl group, carboxylate group, sulfonic acid group, and sulfonate group.

Of these, a carboxylate group or a sulfonate group which is partially or entirely neutralized by a basic compound, etc. is preferable to maintain good water dispersion stability. To introduce an anionic group into a resin, it is suitable to use a monomer having such an anionic group.

To manufacture a water dispersion of resin particles having the anionic group, for example, a basic compound usable to neutralize the anionic group is added to a water dispersion.

Specific examples of the basic compound include, but are not limited to, organic amines such as ammonium, triethyl amine, pyridine, and morpholine, alkanol amine such as monoethanol amine, and metal salt compounds containing Na. K. Li, Ca, etc.

These can be used alone or in combination.

To manufacture a water dispersion using the resin particle of forced emulsification type, for example, a surfactant such as a nonionic surfactant and an anionic surfactant is used.

These can be used alone or in combination.

Of these, nonionic surfactants are preferred in terms of water resistance.

Specific examples of the nonionic surfactants include, but are not limited to, polyoxyethylene alkyl ether, polyoxyethylene alkylene alkyl ether, polyoxyethylene derivatives, polyoxyethylene aliphatic acid esters, polyoxyethylene polyol aliphatic acid ester, polyoxyethylene propylene polyol, sorbitan aliphatic acid ester, polyoxyethylene sorbitan aliphatic acid ester, polyoxyethylene curable ricinus, polyoxyalkylene polycyclic phenylether, polyoxyethylene alkylamine, alkylalkanolamide, and polyalkylene glycol (meth)acrylate. Of these, polyoxyethylene alkylether, polyoxyethylene aliphatic acid esters, polyoxyethylene sorbitan aliphatic acid ester, and polyoxyethylene alkylamine are preferable.

These can be used alone or in combination.

Specific examples of the anionic surfactants include, but are not limited to, alkyl sulfuric acid ester salts, polyoxyethylene alkyl ether sulfuric acid salts, alkyl benzene sulfonic acid salts, α-olefine sulfonic acid salts, methyl lauryl acid salts, sulfosuccinic acid salts, ether sulfonic acid salts, ether carboxylic acid salts, aliphatic acid salts, naphthalene sulfonic acid formalin condensed compounds, alkyl amine salts, quaternary ammonium salts, alkyl betaine, and alkyl amine oxide. Of these, polyoxyethylene alkylether sulfuric acid salts and sulfosuccinic salts are preferable.

When manufacturing a water dispersion using the resin particle of forced emulsification type, the proportion of the surfactant is not particularly limited and can be suitably selected to suit to a particular application. For example, it is preferably from 0.1 to 30 percent by mass and more preferably from 5 to 20 percent by mass to the total amount of the resin particle of forced emulsification type. When the proportion is within the range of from 0.1 to 30 percent by mass, a film of the resin particle is suitably formed and ink having excellent attachability and water resistance is obtained so that recorded matter is free of blocking.

The volume average particle diameter of the polyurethane resin particle is preferably from 10 to 1,000 nm, more preferably from 10 to 500 nm, and furthermore preferably from 10 to 200 nm taking it into account that the ink is used in an inkjet recording device. When the volume average particle diameter is from 10 to 1,000 nm, the contact portions between the organic solvent and the surface of the resin particle increase so that the film-forming property of the resin particulates is improved, thereby forming a continuous film of a robust resin. As a result, tough recorded matter can be obtained.

The volume average particle diameter can be measured by using, for example, a particle size analyzer (Microtrac MODEL UPA 9340, manufactured by Nikkiso Co., Ltd.).

The qualitative and quantitative properties of the resin particle can be checked according to the detailed processes described in "Test Method and Evaluation Result of Each Dynamic Property of Plastic Material (22)", authored by TAKEO Yasuda, JOURNAL OF THE JAPAN PLASTICS INDUSTRY FEDERATION, "Plastics" Edited by Edition Committee. Specifically, infrared spectroscopy (IR), heat analysis such as differential scanning calorimetry (DSC) and thermogravimeter-differential thermal analyzer (TG/DTA), pyrolysis gas chromatography (PyGC), and nuclear magnetic resonance (NMR) are used for analysis.

The glass transition temperature of the resin particle can be measured by a differential scanning calorimeter (for example, DSC6200, manufactured by SEIKO ELECTRONICS INDUSTRIAL CO., LTD.).

Specifically, the resin particle is subject to the following continuous temperature programs of 1 to 4 and the value obtained under the temperature program 3 is determined as the glass transition temperature. Reproducibility of the measuring results is secured by using the value obtained under the temperature program 3 in the measuring under the temperature programs.

Temperature Programs 1. 30 to 250 degrees C.: Temperature rising speed 30 degrees C./min, maintained at one minute 2. 250 degrees C. to −100 degrees C.: Temperature falling speed 30 degrees C./min, maintained at 30 minutes 3. −100 to 250 degrees C.: Temperature rising speed 5 degrees C./min, maintained at one minute 4. 250 degrees C. and 30 degrees C.: Temperature falling speed 30 degrees C./min, maintained at two minutes The proportion of the polyurethane resin particle is 5 percent by mass or greater, preferably from 5 to 20 percent by mass, more preferably from 5 to 15 percent by mass, and particularly preferably from 5 to 10 percent by mass.

If the ink in the present disclosure is heated, the residual solvent decreases, thereby improving attachability. In particular, if the minimum film-forming temperature (hereinafter referred to as MFT) of the resin particle is higher than 80 degrees C., heating is preferable because image robustness can be improved without degrading film-forming of the resin. It is preferable to conduct heating after an application of ink to a recording medium (i.e., recording).

When controlling the minimum film-forming temperature of a resin emulsion to obtain the ink in the present disclosure, for example, the glass transition temperature (hereinafter referred to as Tg) of the resin particle is controlled. When the resin particle is a copolymer, it is possible to control the MFT by changing the ratio of the monomers constituting the copolymer. The minimum film forming temperature is the lowest temperature below which transparent continuous film is not formed when resin particles are extended and flow on a metal plate made of such as aluminum while raising the temperature. At temperatures lower than the lowest layer forming temperature, the emulsion becomes white powder. The minimum layer forming temperature can be measured by using a minimum film forming temperature measuring instrument available on the market such as "film-forming temperature tester" (manufactured by IMOTO MACHINERY CO., LTD.) and "TP-801 MFT tester" (manufactured by TESTER SANGYO CO., LTD.)

In addition, since the minimum film forming temperature varies depending on the volume average particle diameter of the resin particle, it is possible to acquire the target MFT of the resin particle due to the factor of control of the volume average particle diameter of the resin particle.

Organic Solvent (Second Organic Solvent)

The organic solvent (second organic solvent) has no specific limit and is suitably selected to suit to a particular application. For example, water-soluble organic solvents are usable. Note that being water-soluble means, for example, 5 g or more of an organic solvent is dissolved in 100 g of water at 25 degrees C.

Specific examples of the water-soluble organic solvent include, but are not limited to, polyols such as ethylene glycol, diethylene glycol, 1,2-propane diol, 1,3-propane diol, 1,2-butanediol, 1,3-butanediol, 2,3-butanediol, 3-methyl-1,3-butanediol, 3-methoxy-3-methyl butanol, triethylene glycol, polyethylene glycol, polypropylene glycol, 1,5-pentane diol, 2-methyl-2,4-pentan diol, 1,6-hexane diol, glycerin, 1,2,6-hexane triol, 2-ethyl-1,3-hexane diol, 1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and dipropylene glycol monomethyl ether; polyol aryl ethers such as ethylene glycol monophenyl ether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethanolamine; sulfur-containing compounds such as dimethyl sulfoxide, sulfolane, and thiodiethanol; propylene carbonate, and ethylene carbonate. These can be used alone or in combination.

The content ratio (proportion) of the organic solvent is preferably from 10 to 60 percent by mass and more preferably from 20 to 60 percent by mass to the total amount of ink in light of drying property and discharging reliability of the ink.

Water

There is no specific limitation to the water and it can be suitably selected to suit to a particular application. For example, pure water such as deionized water, ultrafiltered water, reverse osmosis water, and distilled water and ultra pure water are suitable. These can be used alone or in combination.

The proportion of the water to the entire ink is preferably from 15 to 60 percent by mass and more preferably from 20 to 40 percent by mass. When the proportion is 15 percent by mass or more, excessive increase of viscosity can be prevented and discharging stability can be improved. When the proportion is 60 percent by mass or less, wettability to a non-permeable recording medium is suitable, which leads to improvement on the image quality.

Other Components

As the other components, examples are coloring materials, surfactants other than polysiloxane surfactants, preservatives and fungicides, corrosion inhibitors, pH regulators, and transparent anti-aging agents for rubber and plastic such as hindered phenol and hindered phenol amine.

Coloring Material

The coloring material has no specific limit and is suitably selected to suit to a particular application. For example, pigments and dyes are usable. Of these, pigments are preferable.

Examples of the pigment are organic pigments and inorganic pigments.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used. These can be used alone or in combination.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (e.g., basic dye type chelates, acid dye type chelates), nitro pigments, nitroso pigments, and aniline black can be used. These can be used alone or in combination.

Also, hollow resin particles and hollow inorganic particles can be used.

Of those pigments, pigments having good affinity with solvents are preferable.

Specific examples of the pigment for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1). These can be used alone or in combination.

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35. These can be used alone or in combination.

To disperse a pigment in ink, for example, a hydrophilic functional group is introduced into the pigment to prepare a self-dispersible pigment, the surface of the pigment is coated with a resin, or a dispersant is used.

To introduce a hydrophilic group into a pigment to obtain a self-dispersible pigment, for example, a functional group such as a sulfone group and a carboxyl group is added to a pigment (e.g., carbon) to allow it dispersible in water.

To disperse a pigment coated with a resin, a pigment encapsulated into a microcapsule is used to allow the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment. Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

Coloring material may be mixed with material such as water and an organic solvent to obtain ink. It is also possible to mix a pigment with water, a dispersant, etc., to prepare a pigment dispersion and thereafter mix the pigment dispersion with material such as water and an organic solvent to manufacture ink.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using the particle size analyzer (Nanotrac Wave-UT 151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

The number average particle diameter of the pigment has no particular limit and can be suitably selected to suit to a particular application. For example, the pigment preferably has a maximum frequency between 20 to 150 nm in the maximum number conversion. When the number average particle diameter is 20 nm or greater, dispersion and classification operations become easy.

When the particle diameter is 150 nm or less, the dispersion stability of pigment as the ink tends to be improved and in addition, discharging stability tends to become excellent, thereby ameliorating the image quality such as image density.

The number average particle diameter can be measured by using a particle size analyzer (Microtrac MODEL UPA 9340, manufactured by Nikkiso Co., Ltd.).

The proportion of the coloring material is preferably from 0.1 to 15 percent by mass and more preferably from 1 to 10 percent by mass to the total amount of the ink in terms of image density, fixability, and discharging stability. When the content ratio (proportion) is from 0.1 to 15 percent by mass, discharging reliability is good and images having high saturation can be obtained.

The proportion of the pigment is preferably from 0.1 to 15 percent by mass, more preferably from 0.1 to 10 percent by mass, and particularly preferably from 1 to 10 percent by mass to the total amount of ink. When the proportion is from 0.1 to 15 percent by mass, it is possible to ameliorate image density, fixability, and discharging stability.

Surfactant Other than Polysiloxane Surfactant

The ink in the present disclosure may contain a surfactant other than the polysiloxane surfactant so as to secure wettability of the ink to a recording medium.

The surfactant other than the polysiloxane surfactant has no particular limit and can be suitably selected to suit to a particular application. For example, anionic surfactants, nonionic surfactants, and amphoteric surfactants are usable. These can be used alone or in combination. Of these, nonionic surfactants are preferred in terms of dispersion stability and image quality.

In addition, it is possible to add a fluorochemical surfactant and/or silicone-based surfactant depending on composition.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides. These can be used alone or in combination.

Proportion of the surfactant other than the polysiloxane surfactant is preferably from 0.1 to 5 percent by mass. When the proportion is 0.1 percent by mass or greater, wettability on a non-permeable recording medium is secured, thereby improving image quality. When the proportion is 5 percent by mass or less, ink tends not to foam so that excellent discharging stability is achieved.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Method of Manufacturing Ink

The ink can be manufactured by, for example, stirring and mixing water, the organic solvent, the polysiloxane surfactant, the polyurethane resin particle, and the other optional components. The ingredients mentioned above are mixed and stirred by, for example, a sand mill, a homogenizer, a ball mill, a paint shaker, an ultrasonic dispersing device, a stirrer having a typical stirring wing, a magnetic stirrer, and a high speed dispersing device.

Properties of ink are not particularly limited and can be suitably selected to suit to a particular application. For example, viscosity, surface tension, pH, etc, are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms of suitable leveling of ink on a recording medium and shortening drying time of the ink.

pH of the ink is preferably from 7 to 12 and more preferably from 8 to 11 in terms of prevention of corrosion of metal material in contact with liquid.

The ink of the present disclosure can be suitably used for inkjet recording.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less from the start of the contact until 30 msec$^{1/2}$ later according to Bristow method.

For example, plastic films such as vinyl chloride resin film, polyethylene terephthalate (PET) film, polypropylene film, polyethylene film, and polycarbonate film are suitably used as the non-permeable substrate.

In addition, for a recording medium colored in such a manner that white ink is applied to the recording medium before color ink at the time of color recording, the recording medium can be colored in white to improve the coloring of the color ink.

For example, the colored recording media can be colored paper, the film mentioned above, fabric, cloth, ceramics, etc.

Ink Container

The ink of the present disclosure is accommodated in an ink container.

The ink container accommodates the ink and includes other optional suitably-selected members.

There is no specific limit to the ink container. It is possible to select any form, any structure, any size, and any material. For example, a container having at least an ink bag formed of aluminum laminate film, a resin film, etc. can be suitably used.

The inkjet printing method includes discharging the ink mentioned above to a recording medium for printing and rinsing the ink remaining on an ink flow path (such as tube) or a recording head with the cleaning liquid of the present disclosure.

The inkjet printing device of the present disclosure includes an ink discharging device to discharge the ink to a recording medium and a rinsing device to rinse the ink remaining on an ink flow path (such as tube) or a recording head with the cleaning liquid of the present disclosure.

The inkjet printing method (recording method) and the inkjet printing device (recording device) of the present disclosure is described in detail.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing device).

In the present disclosure, the recording device and the recording method respectively represent a device capable of discharging ink, various processing fluids, etc. to a recording medium and a method of recording utilizing the device.

The recording medium means an article to which ink or various processing fluids can be attached temporarily or permanently.

The recording device may further optionally include a device relating to feeding, conveying, and ejecting a recording medium and other devices referred to as a pre-processing device, a post-processing device, etc. in addition to the head portion to discharge the ink.

The recording device and the recording method may further optionally include a heating device (heater) for use in the heating process and a drying device (drier) for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll form as a recording medium.

Figure 2:
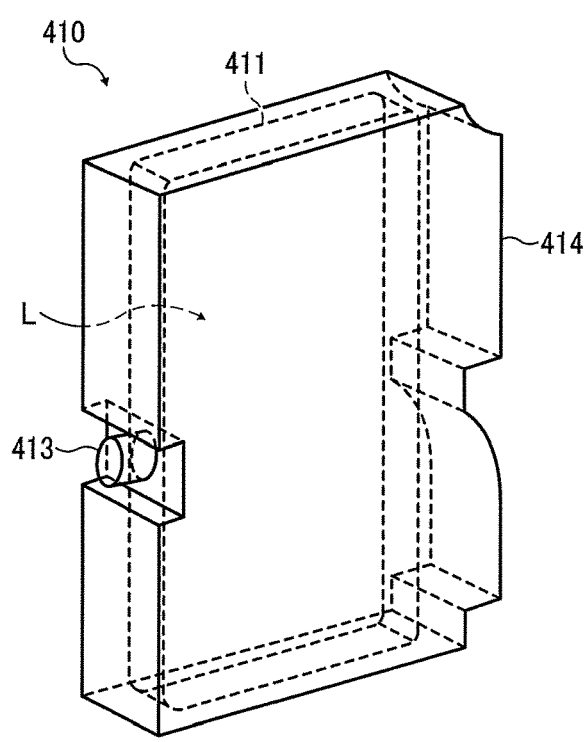
FIG. 2 is a diagram illustrating a perspective view of an example of the main tank of the device illustrated in FIG. 1.

The recording (printing) device is described using an example with reference to FIG. 1 and FIG. 2. FIG. 1 is a diagram illustrating a perspective view of the recording device. FIG. 2 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The cartridge holder 404 is detachably attached to the main tank 410. This enables each ink outlet 413 of the main tank 410 to communicate with a discharging head 434 for each color via a supplying tube 436 for each color so as to discharge the ink from the discharging head 434 to a recording medium.

The inkjet printing method of the present disclosure includes an ink discharging process, preferably a heating process, and other optional processes on a necessity basis.

The inkjet printing device of the present disclosure includes at least an ink discharging device, preferably a heating device, and other suitably selected optional devices on a necessity basis.

The inkjet printing method of the present invention can be suitably conducted by the inkjet printing device and the ink discharging process can be suitably conducted by the ink discharging device. The heating process can be suitably conducted by the heating device. In addition, the other processes are suitably conducted by the other corresponding devices.

Ink Discharging Process and Ink Discharging Device

The ink discharging process is to jet the ink of the present disclosure to form images by an ink discharging device.

The ink discharging device has no particular limit. For example, an inkjet head is usable.

The inkjet head includes a piezoelectric element head of discharging ink droplets by transforming a diaphragm forming the wall of the ink flow path using a piezoelectric element as a pressure generating device to press the ink in the ink flow path; a thermal type inkjet head of producing bubbles by heating ink in the ink flow path with a heat element, and an electrostatic type inkjet head of discharging ink droplets by changes of the volume in the ink flow path caused by transforming a diaphragm that forms the wall surface of the ink flow path by an electrostatic force generated between the diaphragm and the electrode while the diaphragm and the electrode are disposed facing each other.

For example, a stimulus is applied to ink to jet the ink. For example, a stimulus generating device can generate such a stimulus. The stimulus generating device has no specific limit and can be suitably selected to suit to a particular application. For example, heat (temperature), pressure, vibration, and light can be suitably used. These can be used alone or in combination. Of these, heat and pressure are preferable.

How the ink is discharged has no particular limit and differs depending on the kind of the stimulus, etc. When "heat" is used as the stimulus, for example, a thermal head applies thermal energy corresponding to recording signals to the ink in a recording head to generate bubbles in the ink. The pressure of the bubbles causes the ink to jet and spray as liquid droplets from the orifices of nozzles of the recording head. In addition, when the stimulus is "pressure", for example, a method can be used in which a voltage is applied to a piezoelectric element attached to the site referred to as a pressure chamber located in the ink flow path in a recording head to bend the piezoelectric element. This contracts the volume of the pressure chamber, thereby jetting and spraying the ink from the orifices of nozzles of the recording head as liquid droplets.

The ink droplet to be discharged preferably has, for example, a size of from 3 to 40 μL, a discharging speed of from 5 to 20 m/s, a drive frequency of 1 kHz or greater, and a resolution of 300 dpi or greater.

Heating Process and Heating Device

The heating process is to heat a recording medium having a recorded image thereon and can be conducted by a heating device (heater).

Quality images can be recorded on non-permeable recording media as the recording media by the inkjet print method. However, it is preferable to heat the non-permeable recording medium after recording in order to achieve better scratch resistance with better quality images, form images with better attachability to the recording media, and deal with high performance recording conditions. This heating process conducted after recording accelerates film forming of resin particles contained in ink so that image hardness of recorded matter can be enhanced.

The heating temperatures is preferably high in terms of drying property and film-forming temperatures. Specifically, it is more preferably from 40 to 100 degrees C. and particularly preferably from 50 to 90 degrees C. When the heating temperature is in the range of from 40 to 120 degrees C., damage to a non-permeating recording medium due to heat can be prevented and non-discharging ascribable to a heated ink head can be reduced.

Figure 3:
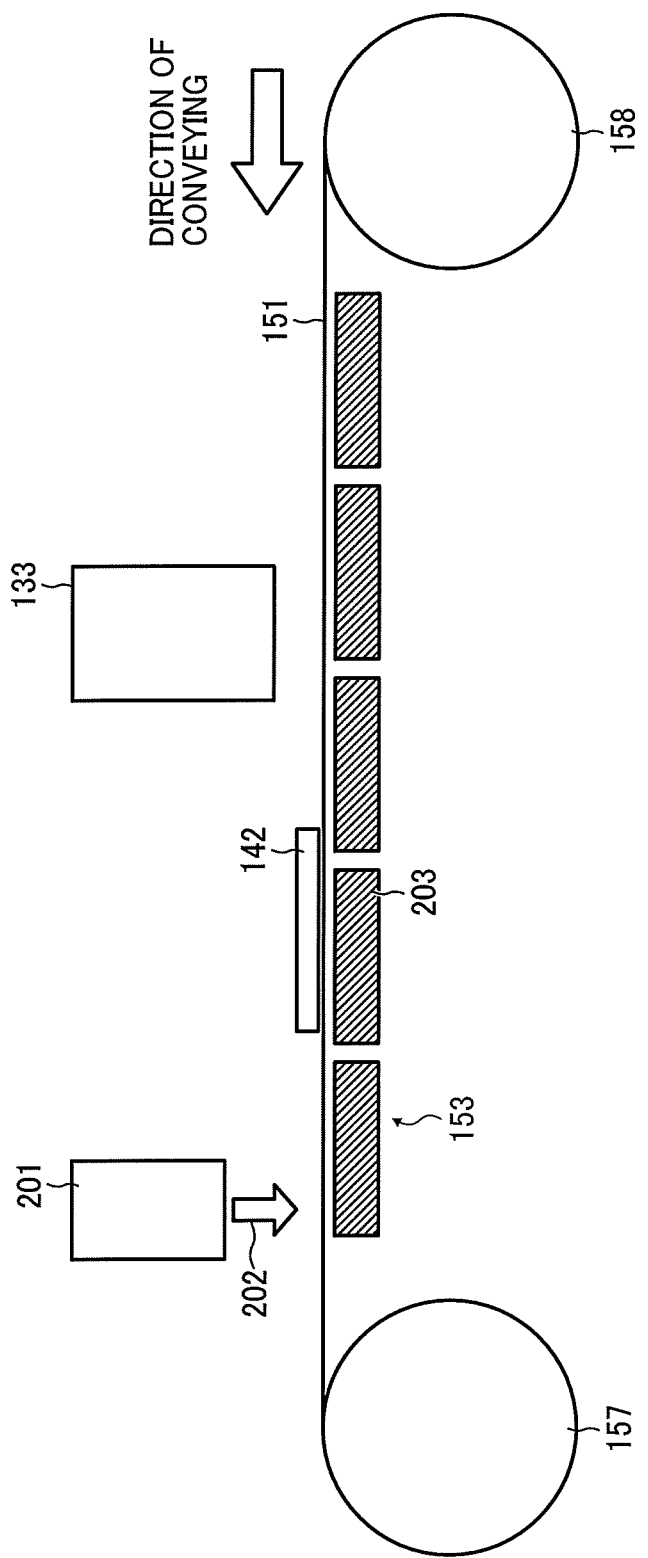
FIG. 3 is a schematic diagram illustrating an example of the heating device illustrated in FIG. 1.

FIG. 3 is a schematic diagram illustrating an example of the heating device illustrated in FIG. 1. As illustrated in FIG. 3, a recording head is driven in response to image signals while moving a carriage 133 and discharges ink droplets onto a recording medium 142 standing still to form an image thereon. A guiding member 153 is a guiding member and also serves as a heater. A heating fan 201 as a heated wind generator blows a heated wind 202 to dry the image formed on the recording medium 142, which is conveyed on a conveyor belt 151 entrained between a conveying roller 157 and a tension roller 158.

A group of heaters 203 are disposed on the reverse side of the conveyor belt 151 regarding the recording medium 142 to apply heat to the recording medium 142 having the image thereon.

Other Processes and Other Devices

The other processes include a stimulus generating process, a control process, etc.

The other devices include a stimulus generating device, a control device, etc.

Specific examples of the stimulus generating device include, but are not limited to, a heater, a pressurizing device, a piezoelectric element, a vibrator, an ultrasonic oscillator, and light. More specifically, there are a piezoelectric actuator as the piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that utilizes an electrostatic force.

The control device (controller) has no particular limit as long as it can control the behavior of each device. It can be suitably selected to suit to a particular application. For example, devices such as a sequencer and a computer are preferable.

The inkjet printing method of the present disclosure may include, for example, applying a clear ink containing no pigment or ink (white ink) containing a white pigment as a coloring material and recording using an ink containing a coloring material. In this example, the clear ink or white ink can be partially or entirely applied to the surface of a recording medium. When partially applied to a recording medium, for example, it is possible to partially or entirely apply the clear ink or the white ink to the same portion as for recording.

For the white ink, it is possible to use the following recording method. The white ink is applied to a recording medium and color ink other than white is applied onto the white ink for recording. According to this method, for example, if a transparent film is used, the white ink is attached to the surface of the recording medium so that visibility of recording is secured. The ink of the present disclosure has also good drying property, good gloss, and strong scratch resistance on a non-permeable recording medium, so that it is possible to coat a non-permeable recording medium such as transparent film with the white ink to enhance visibility.

In addition, white ink can be applied on a transparent film after recording thereon to obtain an image with such excellent visibility. It is also possible to use clear ink instead of white ink to form a layer as a protection layer.

The application of the ink of the present disclosure is not only to inkjet recording methods but also to other methods.

Specific examples of such other methods include, but are not limited to, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, a die coating method, and spray coating method.

As an example of embodiments, in the case of applying the white ink to the entire surface of a recording medium, an applying method other than the inkjet recording method is utilized, and if ink other than white ink is used for recording, the inkjet printing method can be employed.

In another embodiment, the inkjet recording method can be employed for recording using white ink and ink other than the white ink.

It is also possible to use clear ink instead of white ink.

Rinsing Process and Rinsing Device

The rinsing process is to rinse ink adhering to an article such as an ink flow path or a recording head with a cleaning liquid. The rinsing device is to rinse ink adhering to an article such as an ink flow path or a recording head with a cleaning liquid.

The rinsing process and the rinsing device for ink flow path are not particularly limited. For example, a cartridge filled with the cleaning liquid is mounted instead of an ink cartridge to repeat supplying the cleaning liquid to the ink flow path and ejecting the cleaning liquid from the ink flow path; a cleaning liquid is supplied under pressure to an ink flow path from outside; and a cleaning liquid is suctioned from the side of a discharging head using a pump installed outside.

One embodiment of the rinsing process and the rinsing device to rinse ink remaining on a recording head is as follows:

First, for example, a removing member is disposed on a pressing member to apply the cleaning liquid to the removing member. The pressing member has no particular limit and can be suitably selected to suit to a particular application as long as it can press, for example, the nozzle surface of the recording head via the removing device.

Specific examples include, but are not limited to, a pressing roller, a combination of a pressing roller and a pressing belt, a wiper, and a blade. Of these, the pressing roller is preferable.

The removing member has no specific limit and can be suitably selected to suit to a particular application. For example, unwoven fabric and cloth can be used. Preferably, an article is rolled up in a roll-like form. Unwoven fabric having a roll-like form is preferable because it does not easily produce dust and is highly reliable.

The supply amount of the cleaning liquid is controlled depending on recording time. In this case, it is preferable to select the supply amount of the cleaning liquid from multiple set values. The multiple set values are, for example, pressure, number of supplies, and number of nozzles.

It is preferable to control the supply amount of the cleaning liquid by a pressure applied to a cleaning liquid applying nozzle as a cleaning liquid applying device. In addition, if the cleaning liquid is applied from multiple cleaning liquid applying nozzles, it is preferable to control the supply amount of the cleaning liquid by the number of the cleaning liquid applying nozzles. Moreover, it is preferable to control the supply amount of the cleaning liquid by the number of applying the cleaning liquid from the cleaning liquid applying nozzle.

The cleaning liquid applying device has no particular limit and can be suitably selected to suit to a particular application. Preferably, it applies the cleaning liquid in a constant amount. For example, nozzles, sprays, dispensers, and applicators can be used.

Figure 4:
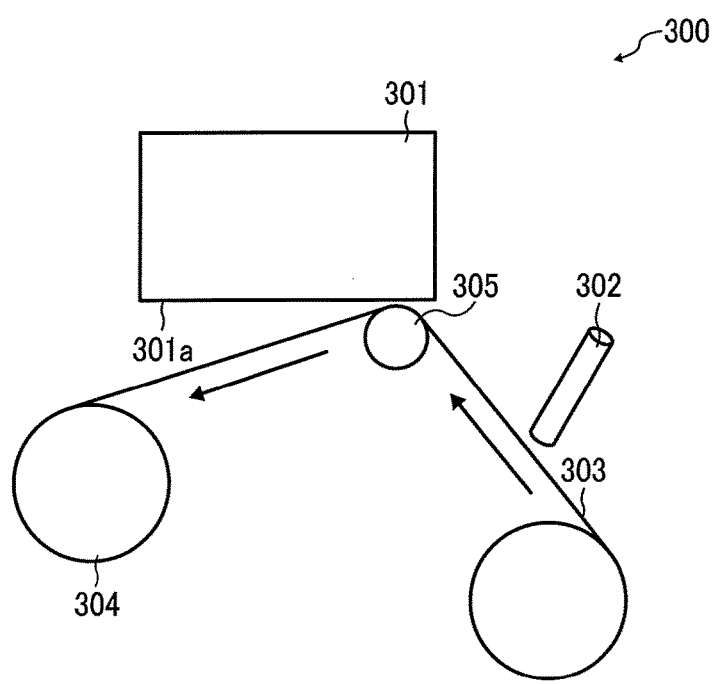
FIG. 4 is a schematic diagram illustrating an example of the cleaning device according to an embodiment of the present disclosure.

FIG. 4 is a schematic diagram illustrating an example of the rinsing device in the present disclosure. As illustrated in FIG. 4, a rinsing device 300 cleans a nozzle surface 301a on the ink discharging side of a nozzle plate 301 of an ink discharging head.

The rinsing device 300 includes an unwoven 303 as the removing device, a cleaning liquid applying nozzle 302 as the cleaning liquid applying device, a pressing roller 305 as the pressing member, and a roll-up roller 304 to roll up the unwoven fabric after the removing process.

The cleaning liquid is supplied from a cleaning liquid tank (cleaning liquid container) via a cleaning liquid supply tube. When driving a pump disposed in the middle of the cleaning liquid supply tube, the cleaning liquid applying nozzle 302 applies the cleaning liquid to the unwoven fabric 303 as the removing member in an amount depending on the recording time. The unwoven fabric 303 is rolled up in a roll-like form.

As illustrated in FIG. 4, the unwoven fabric 303 to which the cleaning liquid is applied is brought into contact with the nozzle surface 301a of the ink discharging head 301 under a pressure so that the nozzle surface 301a is cleaned. After the removing process, the unwoven fabric 303 is rolled up by a roll-up roller 304.

Printed Matter

It is possible to obtain printed matter by printing on a recording medium using the ink in the present disclosure.

The printed matter can be produced using an inkjet printing (recording) device.

Also, the printed matter includes a recording medium and a print layer containing a polysiloxane surfactant and polysiloxane resin particle. The polysiloxane surfactant includes a polysiloxane surfactant having an HLB value of 8 or less.

Image forming, recording, printing, etc. in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto.

Preparation Example of Pigment Dispersion

Preparation of Black Pigment Dispersion

After preliminarily mixing the following recipe, the mixture was subject to circulation dispersion for seven hours with a disk type bead mill (KDL type, media: zirconia ball having a diameter of 0.3 mm, manufactured by SHINMARU ENTERPRISES CORPORATION) to obtain a black pigment dispersion (concentration of pigment solid portion: 15 percent by mass) of self dispersion type.

| | |
|---|---|
| Carbon black pigment (Product: Monarch 800, manufactured by Cabot Corporation): | 15 parts |
| Anionic surfactant (Product: Pionine A-51-B, manufactured by TAKEMOTO OIL & FAT Co., Ltd.): | 2 parts |
| Deionized water: | 83 parts |

Preparation of Polyurethane Resin Emulsion 100 parts of methylethyl ketone, 345 parts of polyester-polyol 1 (which was obtained from iPA/AA=6/4 in molar ratio and EG/MPG=1/9 in molar ratio, where iPA=isophthalic acid, AA=adipic acid, EG=ethylene glycol, and NPG=neopentyl glycol, number average molecular weight=3,000, number of average functional groups=2) and 9.92 parts by mass of 2,2-dimethylol propionic acid (DMPA) were placed in a reaction container (2 L) equipped with a stirrer, a thermometer, a nitrogen sealing tube, and a condenser and uniformly mixed at 60 degrees C.

Thereafter, 45.1 parts of triethylene glycol diisocyanate (TEGDI) and 0.08 parts of dioctyltin dilaurate (DOTDL) were loaded therein to react at 72 degrees C. for three hours to obtain a polyurethane solution.

To this polyurethane solution, 80 parts of isopropyl alcohol (IPA), 220 parts of methylethyl ketone (MEK), 3.74 parts of triethylamine (TEA), and 596 parts of water were loaded to cause transfer phase. Subsequently, MEK, and IPA were removed by a rotary evaporator to obtain a polyurethane resin emulsion.

After the thus-obtained aqueous emulsion was cooled down to room temperature, deionized water and aqueous sodium hydroxide solution were added to adjust the solution such that the solid portion thereof was 30 percent by mass and the pH was 8.

The glass transition temperature (Tg) of the polyurethane resin emulsion was −10 degrees as measured by Thermo plus EVO2 (manufactured by Rigaku).

Preparation Example 1 of Ink

A self-dispersible black pigment dispersion (20 percent by mass), a silicone compound having a polyoxyalkylene group (1.0 percent by mass) (polysiloxane surfactant 1, FZ2110, HLB value: 1.0, manufactured by Dow Corning Toray Co., Ltd.), the polyurethane resin emulsion (16.7 percent by mass) obtained as described above, 1,2-propane diol (20 percent by mass), 2.3-butanediol (3 percent by mass), 3-methoxy-3-methylbutanol (6 percent by mass), 2-methyl-2,4-pentanediol (3 percent by mass), a fungicide (0.1 percent by mass) (Proxel LV, manufactured by AVECIA GROUP), and a balance of highly pure water were mixed, The thus obtained mixture was subjected to filtration using a polypropylene filter (Betafine polypropylene pleated filter PPG series, manufactured by 3M Company) having an average opening diameter of 0.2 μm to prepare an ink 1.

Ink Preparation Examples 2 to 9

Inks 2 to 9 were obtained in the same manner as in Preparation Example 1 of Ink except that the compositions and the proportions were changed to those shown in Table 1.

TABLE 1

| | Ink No. | | | | |
|---|---|---|---|---|---|
| | 1 | 2 | 3 | 4 | 5 |
| Black pigment dispersion | 20 | 20 | 20 | 20 | 20 |
| Polysiloxane surfactant 1 HLB value = 1.0 | 1.0 | | | | 0.8 |
| Polysiloxane surfactant 2 HLB value = 4.0 | | 2 | | | |
| Polysiloxane surfactant 3 HLB value = 4.5 | | | 1.6 | | |
| Polysiloxane surfactant 4 HLB value = 8.0 | | | | 1.6 | |
| Polysiloxane surfactant 5 HLB value = 10.0 | | | | | |
| Polyurethane resin particle non-volatile portion: 30 percent | 16.7 | 23.3 | 16.7 | 20.0 | 20.0 |
| 1,2-Propane diol: | 20 | 18 | 15 | 15 | 16 |
| 2,3-Butanediol | 3 | 5 | 10 | 6 | 5 |
| 3-Methoxy-3-methylbutanol | 6 | 3 | 8 | 10 | 4 |
| 2-Methyl-2,4-pentanediol | 3 | 3 | 4 | 6 | 5 |

TABLE 1-continued

| | | | | | |
|---|---|---|---|---|---|
| PROXEL LV, manufactured by AVECIA GROUP | 0.1 | 0.1 | 0.1 | 0.1 | 0.1 |
| Highly pure water | Balance | Balance | Balance | Balance | Balance |
| Total amount | 100 | 100 | 100 | 100 | 100 |

| | Ink No. | | | |
|---|---|---|---|---|
| | 6 | 7 | 8 | 9 |
| Black pigment dispersion | 20 | 20 | 20 | 20 |
| Polysiloxane surfactant 1 HLB value = 1.0 | | 1 | 1 | |
| Polysiloxane surfactant 2 HLB value = 4.0 | 2.4 | | | |
| Polysiloxane surfactant 3 HLB value = 4.5 | | | | |
| Polysiloxane surfactant 4 HLB value = 8.0 | | | | |
| Polysiloxane surfactant 5 HLB value = 10.0 | | | | 2.4 |
| Polyurethane resin particle non-volatile portion: 30 percent | 16.7 | 33.3 | 50.0 | 16.7 |
| 1,2-Propane diol: | 13 | 15 | 15 | 13 |
| 2,3-Butanediol | 3 | 5 | 5 | 3 |
| 3-Methoxy-3-methylbutanol | 3 | 3 | 3 | 3 |
| 2-Methyl-2,4-pentanediol | 5 | 3 | 3 | 5 |
| PROXEL LV, manufactured by AVECIA GROUP | 0.1 | 0.1 | 0.1 | 0.1 |
| Highly pure water | Balance | Balance | Balance | Balance |
| Total amount | 100 | 100 | 100 | 100 |

In Table 1, the product names and the manufacturing companies of the ingredients are as follows:

Polysiloxane surfactant 1: silicone product having a polyoxialkylene group, FZ2110, HLB value of 1.0, manufacture by Dow Corning Toray Co., Ltd.
Polysiloxane surfactant 2: polyether-modified silicone, KF-945, HLB value of 4.0, manufacture by Shin-Etsu Chemical Co., Ltd.
Polysiloxane surfactant 3: polyether-modified silicone, KF-6017, HLB value of 4.5, manufacture by Shin-Etsu Chemical Co., Ltd.
Polysiloxane surfactant 4: polyether-modified silicone, SH-3773M, HLB value of 8.0, manufacture by Dow Corning Toray Co., Ltd.
Polysiloxane surfactant 5: polyether-modified silicone, KF-353, HLB value of 10.0, manufacture by Shin-Etsu Chemical Co., Ltd.
1,2-Propane diol: manufactured by ADEKA
2,3-butanediol: manufactured by Tokyo Chemical Industry Co. Ltd.
2-Methoxy-3-methylbutanol: manufactured by KURARAY CO., LTD.
2-methyl-2,4-pentanediol: manufactured by Wako Pure Chemical Industries, Ltd.
Fungicide: PROXEL LV, manufactured by AVECIA GROUP Preparation Example 1 of Cleaning Liquid 1,2-Butanediol (5.0 percent by mass) {(δH of HSP: 10.39 (cal/cm$^3$)$^{1/2}$, specific gravity of 1.04)}, 3-methoxy-3-methyl-1-butanol (15 percent by mass) {(δH of HSP: 6.29 (cal/cm$^3$)$^{1/2}$, specific gravity of 0.927)}, 2-pyrolidone (60 percent by mass) {(δH of HSP: 4.39 (cal/cm$^3$)$^{1/2}$, specific gravity of 1.10)}, fluorochemical surfactant (1.0 percent by mass) {(ZONYL™ FSO-100, manufactured by E. I. du Pont de Nemours and Company)}, and a defoaming agent (0.10 percent by mass) (2,4,7,9-tetramethyl-4,7-decane diol, manufactured by Nisshin Chemical Co., Ltd.), and a balance of deionized water were stirred for one hour to obtain a cleaning liquid 1.

Preparation Examples 2 to 5 of Cleaning Liquids

Preparation of Cleaning Liquids 2 to 5

Cleaning liquids 2 to 5 were obtained in the same manner as in Preparation Example 1 of the cleaning liquid except that the composition and the proportion were changed to those shown in Table 2.

TABLE 2

| | Cleaning liquid No. | | | | |
|---|---|---|---|---|---|
| | 1 | 2 | 3 | 4 | 5 |
| 1,2-Propane diol: | | 25 | | 15 | 30 |
| 1,2-Butanediol | 5 | | 10 | | |
| 1,3-Butanediol | | 20 | | | 20 |
| 1,2-Hexane diol | | | 10 | 20 | |
| 3-Methoxy-3-methylbutanol | 15 | | 50 | 30 | 5 |
| 2-Pyrroridone | 60 | 15 | | | |

TABLE 2-continued

|  | Cleaning liquid No. | | | | |
| --- | --- | --- | --- | --- | --- |
|  | 1 | 2 | 3 | 4 | 5 |
| Fluorochemical surfactant | 1.0 | 1.0 | 1.0 | 1.0 | 1.0 |
| 2,4,7,9-Tetramethyl-4,7-decanediol | 0.1 | 0.1 | 0.1 | 0.1 | 0.1 |
| Highly pure water | Balance | Balance | Balance | Balance | Balance |
| Total amount | 100 | 100 | 100 | 100 | 100 |
| $\delta H$ {$(cal/cm^3)^{1/2}$)} of HSP of liquid mixture | 6.2 | 9.9 | 8.5 | 9.3 | 10.8 |

In Table 2, the product names and the manufacturing companies of the ingredients are as follows:
1,2-Propane diol: manufactured by ADEKA
1,2-Butanediol: manufactured by Tokyo Chemical Industry Co. Ltd.
1,3-Butanediol: manufactured by Tokyo Chemical Industry Co. Ltd.
1,2-Hexane diol: manufactured by Tokyo Chemical Industry Co. Ltd.
3-Methoxy-3-methyl-1-butanol: manufactured by KURARAY CO., LTD.
2-Pyrroridone: manufactured by Tokyo Chemical Industry Co. Ltd.
Fluorochemical surfactant: ZONYL™ FSO-100, manufactured by E. I. du Pont de Nemours and Company
Defoaming agent: 2,4,7,9-tetramethyl-4,7-decane diol, manufactured by Nisshin Chemical Co., Ltd.

Example 1

The ink 1 and the cleaning liquid 1 were combined as a set of ink and cleaning liquid Examples 2 to 11 and Comparative Examples 1 to 2

Sets of inks and cleaning liquids were prepared in the same manner as in Example 1 except that the inks and the cleaning liquids were changed in accordance with the combinations shown in Table 3.

Using the thus-obtained ink and the cleaning liquid, abrasion resistance, chemical resistance, fixability (beading), image gloss, attachability, discharging stability, and cleaning power were evaluated. The results are shown in Table 3.

Taking into account outdoor use, significantly severe criteria were employed to evaluate fixability (beading) and scratch resistance in comparison with recording on plain paper.

Forming of Solid Image

An inkjet printer (remodeled based on IPSiO GXe5500, manufactured by Ricoh Company Ltd.) were filled with each of the inks 1 to 9 and recorded a solid image on a recording medium of polyvinylchloride film (CPPVWP 1300, manufactured by SAKURAI CO., LTD., hereinafter also referred to as PVC film) in an ink attachment amount of 0.6 g/cm². After recording, the solid image was dried for one hour on a hot plate (NINOS ND-1, manufactured by AS ONE Corporation.) set at 80 degrees C.

Note that the inkjet printer was remodeled to a degree that the remodeled machine was able to reproduce recording equivalent to a recording speed of 30 m²/hour with a print width of 150 cm on A4 size recording medium and the hot plate was mounted to change the heating conditions (heating temperature and heating time) after recording.

Scratch Resistance

The solid image formed on the PVC film recording medium was scratched by dry cotton (unbleached muslin No. 3) with a load of 400 g and the image was visually observed to evaluate scratch resistance according to the following criteria. The evaluation rating of B and above are preferable in terms of practical use.

Evaluation Criteria
AA: No change in image when scratched 50+ times
A: Slight scratch observed when scratched 50 times but causing no impact on image density
B: No change in image when scratched 31 to 49 times
C: No change in image when scratched 30-times Chemical Resistance The solid image formed on PVC film recording medium was dipped in 60 percent by mass aqueous ethanol solution (25 degrees C.) for 24 hours and naturally dried at room temperature (25 degrees C.) for 24 hours. Thereafter, using X-Rite 938 (manufactured by X-Rite), the image density was measured and the reduction amount of the image density value in the image density after dipping to the initial density of the image before dipping was calculated to evaluate chemical resistance according to the following evaluation criteria. B and above in the evaluation are preferable in terms of practical use.

Evaluation Criteria
AA: Reduction of image density is less than 10 percent
A: Reduction of image density is from 10 percent to less than 20 percent
B: Reduction of image density is from 20 percent to less than 30 percent
C: Reduction of image density is 30 percent or greater Fixability (Beading)

Uneven recording of the solid image formed on the PVC film recording medium was visually observed to evaluate fixability (beading) according to the following evaluation criteria. B and above in the evaluation are preferable in terms of practical use.

Evaluation Criteria
A: Excellent (No beading observed)
B: Good (Beading slightly observed)
C: Fair (Beading observed)
D: Poor (Beading significantly observed)

Image Gloss

Gloss at 60° degree of the solid image formed on the PVC film recording medium was measured by a gloss meter (4501, manufactured by BYK Gardener) four times to obtain the average of the gloss values to evaluate image gloss according to the following criteria. B and above in the evaluation are preferable in terms of practical use.

Evaluation Criteria
AA: Gloss value is 100 or greater
A: Gloss value is 90 to less than 100
B: Gloss value is 80 to less than 90
C: Gloss value is less than 80

Attachability

According to the grid peeling test using a cloth adhesive tape (123 LW-50, manufactured by Nichiban Co., Ltd.) for the solid image formed on the PP film recording medium (P2161, manufactured by TOYOBO CO., LTD.) in the same manner as in the forming method of the solid image, the number of grids remaining in the 100 test grids was counted to evaluate attachability for recording medium based on the following evaluation criteria. B and above in the evaluation are preferable in terms of practical use.

Evaluation Criteria
AA: Number of remaining grids is 98 or greater
A: Number of remaining grids is 90 to less than 98
B: Number of remaining grids is 70 to less than 90
C: Number of remaining grids of 70 or less Discharging Stability Using a printer (IPSiO GXe 3300, manufactured by Ricoh Company Ltd.), the ink was continuously discharged for 45 minutes and thereafter the surface of the recording head was dried for 30 minutes after discharging was ceased. Thereafter, 3 mL of the cleaning liquid was applied to the nozzle surface of the recording head using a dropper. Subsequently, the nozzle surface was wiped off, and the ink was discharged again to evaluate discharging stability based on the following evaluation criteria. B and above in the evaluation are preferable in terms of practical use.

Evaluation Criteria
A: No discharging disturbance and no non-discharging occurred
B: Discharging disturbance and non-discharging occurred at 5 or less nozzles
C: Discharging disturbance and non-discharging occurred at more than 5 nozzles Cleaning Power SUS316 plate (3 cm×4 cm) was dipped in the ink for 60 minutes. Thereafter, the SUS 316 plate was allowed to rest and dry in atmosphere at the room temperature (25 degrees) under a pressure of 0.1 MPa for two hours. As a result, the SUS 316 plate to which dried ink firmly adhered was obtained.

The SUS 316 plate to which the dried ink firmly adhered was repeatedly washed for three minutes using 30 mL of the cleaning liquid to rinse the ink adhering to the plate. After repeating washing, the SUS 316 plate was visually observed to evaluate cleaning power based on the following evaluation criteria. B and above in the evaluation are preferable in terms of practical use.

Evaluation Criteria
A: No dried ink firmly adhering to the plate observed at all during the initial washing (within one minute)
B: No dried ink firmly adhering to the plate observed at all after washing
C: Dried ink firmly adhering to the plate slightly observed after rinsing
D: No change observed for dried ink firmly adhering to the plate before and after washing

TABLE 3

| | | Ink no. | Cleaning liquid No. | Evaluation results | | | |
|---|---|---|---|---|---|---|---|
| | | | | Scratch resistance | Chemical resistance | Fixability (beading) | Image gloss |
| Example | 1 | 1 | 1 | AA | AA | A | AA |
| | 2 | 2 | 1 | A | AA | A | AA |
| | 3 | 1 | 2 | AA | AA | A | AA |
| | 4 | 3 | 1 | A | AA | A | B |

TABLE 3-continued

| | | Ink no. | Cleaning liquid No. | Scratch resistance | Chemical resistance | Fixability (beading) | Image gloss |
|---|---|---|---|---|---|---|---|
| | 5 | 4 | 1 | A | AA | A | B |
| | 6 | 5 | 1 | AA | B | B | AA |
| | 7 | 6 | 1 | A | AA | A | A |
| | 8 | 7 | 1 | AA | AA | A | AA |
| | 9 | 8 | 1 | AA | AA | A | AA |
| | 10 | 1 | 3 | AA | AA | A | AA |
| | 11 | 1 | 4 | AA | AA | A | AA |
| Comparative Example | 1 | 9 | 1 | A | A | D | C |
| | 2 | 1 | 5 | AA | AA | A | AA |

| | | Ink no. | Cleaning liquid No. | Evaluation results | | |
|---|---|---|---|---|---|---|
| | | | | Attachability | Discharging stability | Cleaning power |
| Example | 1 | 1 | 1 | A | A | A |
| | 2 | 2 | 1 | AA | A | A |
| | 3 | 1 | 2 | A | B | A |
| | 4 | 3 | 1 | AA | A | A |
| | 5 | 4 | 1 | AA | A | A |
| | 6 | 5 | 1 | AA | A | A |
| | 7 | 6 | 1 | AA | B | A |
| | 8 | 7 | 1 | A | A | A |
| | 9 | 8 | 1 | A | B | B |
| | 10 | 1 | 3 | A | A | B |
| | 11 | 1 | 4 | A | B | B |
| Comparative Example | 1 | 9 | 1 | A | C | C |
| | 2 | 1 | 5 | A | C | D |

Examples 1, 2, and 8 are preferable embodiments of the present disclosure. As seen in the results, attachability to PP film recording media is excellent. High image gloss are also obtained when printing on a non-permeating recording medium. Moreover, the obtained images have good scratch resistance and chemical resistance and cleaning power and discharging stability are also found to be excellent.

In Example 3, the hydrogen bond term of the Hansen solubility parameter in the liquid mixture of the cleaning liquid is slightly high. Therefore, Example 3 is slightly inferior to Examples 1, 2, and 8 regarding discharging stability.

In Examples 4 and 5, HLB values of the polysiloxane surfactant in the inks are slightly high. Therefore, Examples 4 and 5 are slightly inferior to Examples 1, 2, and 8 regarding image gloss.

In Example 6, the addition amount of the polysiloxane surfactant in the ink is slightly small. Therefore, Example 6 is slightly inferior to Examples 1, 2, and 8 regarding fixability and chemical resistance.

In Example 7, the addition amount of the polysiloxane surfactant in the ink is slightly large. Therefore, Example 7 is slightly inferior to Examples 1, 2, and 8 regarding discharging stability.

In Example 9, the addition amount of the polyurethane resin in the ink is slightly large. Therefore, Example 9 is slightly inferior to Examples 1, 2, and 8 regarding discharging stability and cleanability.

In Examples 10 and 11, the cleaning liquid contains no solvent having a hydrogen bond term of the Hansen solubility parameter of 5.0 $(cal/cm^3)^{1/2}$ or less. Therefore, Examples 10 and 11 are slightly inferior to Examples 1, 2, and 8 regarding cleaning power.

In Comparative Example 1, the polysiloxane surfactant having an HLB value of 8 or greater is used in the ink. Therefore, Comparative Example 1 is inferior to Examples regarding fixability, image gloss, discharging stability, and cleaning power.

In Comparative Example 2, the hydrogen bond term of the Hansen solubility parameter in the liquid mixture of the cleaning liquid surpasses 10 $(cal/cm^3)^{1/2}$. Therefore, Comparative Example 2 is inferior to Examples regarding discharging stability and cleaning property.

Judging from the evaluation results shown in Table 3, the ink of the present disclosure is found to be suitable for outdoor use. In addition, the ink sets of Examples 1 to 11 have excellent scratch resistance, chemical resistance, fixability, image gloss, attachability, discharging stability, and cleaning power.

Aspects of the present disclosure are, for example, as follows:

1. A cleaning liquid for rinsing an ink adhering to an article includes water; and a first organic solvent, wherein a liquid mixture of the water and the first organic solvent has a Hansen solubility parameter including a hydrogen bond term of 10.0 $(cal/cm^3)^{1/2}$ or less, wherein the ink includes water, a second organic solvent, a polyurethane resin particle, and a polysiloxane surfactant having an HLB value of 8 or less, wherein the polyurethane resin particle accounts for 5 percent by mass or more of a total amount of the ink.

2. The cleaning liquid according to 1 mentioned above, wherein the hydrogen bond term of the Hansen solubility parameter of the liquid mixture is 8.5 $(cal/cm^3)^2$ or less.

3. The cleaning liquid according to 1 or 2 mentioned above, wherein the polysiloxane surfactant has an HLB value of 4 or less.

4. The cleaning liquid according to any one of 1 to 3, wherein the polysiloxane surfactant accounts for 1.0 to 2.0 percent by mass of the total amount of the ink.

5. The cleaning liquid according to any one of 1 to 4, wherein the liquid mixture includes at least one organic solvent having a hydrogen bond term of a Hansen solubility parameter of 5.0 $(cal/cm^3)^{1/2}$ or less.

6. A container includes a cleaning liquid to rinse an ink adhering to an article; an accommodating unit to accommodate the cleaning liquid, wherein the cleaning liquid includes water and a first organic solvent, wherein a liquid mixture of the water and the first organic solvent has a hydrogen bond term of a Hansen solubility parameter of 10.0 $(cal/cm^3)^{1/2}$ or less, wherein the ink includes water, a second organic solvent, a polyurethane resin particle, and a polysiloxane surfactant having an HLB value of 8 or less, wherein the polyurethane resin particle accounts for 5 percent by mass or more of a total amount of the ink.

7. An inkjet printing method includes discharging an ink to a recording medium for printing and rinsing the ink remaining on an ink flow path or a recording head with a cleaning liquid, wherein the cleaning liquid includes water and a first organic solvent, wherein a liquid mixture of the water and the first organic solvent has a Hansen solubility parameter including a hydrogen bond term of 10.0 $(cal/cm^3)^{1/2}$ or less, wherein the ink includes water, a second organic solvent, a polyurethane resin particle, and a polysiloxane surfactant having an HLB value of 8 or less, wherein the polyurethane resin particle accounts for 5 percent by mass or more of the total amount of the ink.

8. An inkjet printing device includes an ink discharging device configured to discharge an ink to a recording medium and a rinsing device configured to rinse the ink remaining on an ink flow path or a recording head with a cleaning liquid, wherein the cleaning liquid includes water and a first organic solvent, wherein a liquid mixture of the water and the first organic solvent has a Hansen solubility parameter including a hydrogen bond term of 10.0 $(cal/cm^3)^{1/2}$ or less, wherein the ink includes water, a second organic solvent, a polyurethane resin particle, and a polysiloxane surfactant having an HLB value of 8 or less, wherein the polyurethane resin particle accounts for 5 percent by mass or more of the total amount of the ink.

9. A set of an ink and a cleaning liquid to rinse the ink adhering to an article, wherein the cleaning liquid includes water and a first organic solvent, wherein the ink includes water, a second organic solvent, a polyurethane resin particle accounting for 5 percent by mass or more of a total amount of the ink, and a polysiloxane surfactant having an HLB value of 8 or less, wherein a liquid mixture of the water and the first organic solvent has a hydrogen bond term of a Hansen solubility parameter of 10.0 $(cal/cm^3)^{1/2}$ or less.

According to the present disclosure, a cleaning liquid is provided which has an excellent cleaning power against an article to which an ink adheres, the ink containing a particular resin and a surfactant to enhance fixability.

Having now fully described embodiments of the present invention, it will be apparent to one of ordinary skill in the art that many changes and modifications can be made thereto without departing from the spirit and scope of embodiments of the invention as set forth herein.

What is claimed is:

1. A cleaning liquid for rinsing an ink adhering to an article comprising:
   water; and
   a first organic solvent,
   wherein a liquid mixture of the water and the first organic solvent has a Hansen solubility parameter including a hydrogen bond term of 10.0 $(cal/cm^3)^{1/2}$ or less,
   wherein the ink includes water, a second organic solvent, a polyurethane resin particle, and a polysiloxane surfactant having an HLB value of 8 or less,
   wherein the polyurethane resin particle accounts for 5 percent by mass or more of a total amount of the ink.

2. The cleaning liquid according to claim 1, wherein the hydrogen bond term of the Hansen solubility parameter of the liquid mixture is 8.5 $(cal/cm^3)^{1/2}$ or less.

3. The cleaning liquid according to claim 1, wherein the polysiloxane surfactant has an HLB value of 4 or less.

4. The cleaning liquid according to claim 1, wherein the polysiloxane surfactant accounts for 1.0 to 2.0 percent by mass of a total amount of the ink.

5. The cleaning liquid according to claim 1, wherein the liquid mixture includes at least one organic solvent having a hydrogen bond term of a Hansen solubility parameter of 5.0 $(cal/cm^3)^{1}$ 2 or less.

6. A container comprising:
   a cleaning liquid to rinse an ink adhering to an article; and
   an accommodating unit to accommodate the cleaning liquid,
   wherein the cleaning liquid includes water and a first organic solvent,
   wherein a liquid mixture of the water and the first organic solvent has a hydrogen bond term of a Hansen solubility parameter of 10.0 $(cal/cm^3)^{1/2}$ or less,
   wherein the ink includes water, a second organic solvent, a polyurethane resin particle, and a polysiloxane surfactant having an HLB value of 8 or less,
wherein the polyurethane resin particle accounts for 5 percent by mass or more of a total amount of the ink.

7. An inkjet printing method comprising:
   discharging the ink of claim 1; and
   rinsing the ink remaining on an ink flow path or a recording head with the cleaning liquid of claim 1.

8. An inkjet printing device comprising:
an ink discharging device configured to discharge the ink of claim 1 to a recording medium; and
a rinsing device to rinse the ink remaining on an ink flow path or a recording head with the cleaning liquid of claim 1.

9. A set comprising:
an ink; and
a cleaning liquid to rinse the ink adhering to an article,
wherein the cleaning liquid includes water and a first organic solvent,
wherein the ink includes water, a second organic solvent, a polyurethane resin particle accounting for 5 percent by mass or more of a total amount of the ink, and a polysiloxane surfactant having an HLB value of 8 or less,
wherein a liquid mixture of the water and the first organic solvent has a hydrogen bond term of a Hansen solubility parameter of 10.0 $(cal/cm^3)^{1/2}$ or less.

* * * * *